Figure 1:
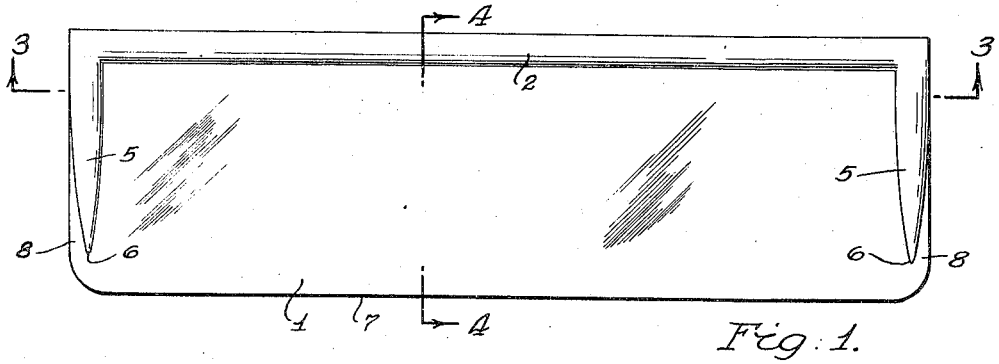

May 30, 1939.  R. C. JACOBS  2,160,504

AUTOMOBILE GLARE SHIELD

Filed Feb. 15, 1937

Inventor
Rex C. Jacobs

By
Attorneys

Patented May 30, 1939

2,160,504

UNITED STATES PATENT OFFICE 2,160,504

AUTOMOBILE GLARE SHIELD

Rex C. Jacobs, Detroit, Mich.

Application February 15, 1937, Serial No. 125,705

4 Claims. (Cl. 296—97)

The present invention relates to automobile glare shields of the type which are transparent to a degree whereby they permit the operator of an automobile to observe the headlights of approaching vehicles without the glare from such headlights having harmful effect on the vision of the operator.

It is common practice to support automobile glare shields on a horizontal pivot upon which it may be swung to various positions, one being a position where it extends within the margin of the windshield opening and another being a position where it lies close to the roof of the automobile. Usually the element which provides a horizontal pivot is supported by a vertical pivot about which it may swing in a horizontal arc so as to position it adjacent the windshield opening or adjacent a window opening at one side of the windshield opening. The main object of the present invention is to provide a semi-transparent glare shield for support by a horizontal pivot of the character referred to above.

An important object of the present invention is to provide a glare shield which is shatter proof and non-inflammable. That is, the glare shield is formed of material embodying elasticity so that in the event of an accident and it becomes broken jagged splinters will not cause harm to the occupants of the automobile. Due to the close proximity of the glare shield to the eyes of the operator it is undesirable that it be formed of ordinary glass and laminated, shatter proof glass is ordinarily too heavy to hold positions of adjustment under the conditions of vibration which accompanies operation of a vehicle.

Still another important object of the present invention is to provide a semi-transparent glare shield of a material which may be molded and which includes coloring material. With such material the thickness thereof determines the degree of transparency and if the material passes a certain degree of thickness it becomes opaque. This characteristic presents a problem in that the material when molded thin enough to provide the desired degree of transparency it is not strong enough for its intended purpose. If it is made thick enough to provide the required mechanical strength it becomes practically opaque, or at least translucent.

With the above mentioned conditions in view the invention has as a further object to provide a glare shield of the material referred to embodying the desired degree of transparency and the required amount of mechanical strength. This is accomplished by forming the shield with a rigid metal tube extending along the upper edge thereof and imbedded in the material of which the shield is formed. One end of the metal tube is exposed so that a rod, which constitutes a horizontal pivot in the glare shield assembly, may be inserted therein. This tube rigidifies the upper edge of the shield and to rigidify the vertical edges of the shield reinforcements are provided. These side reinforcements are formed by thickening the material of the shield and result in opaque portions. As pointed out, the opaque condition is undesirable, and in order to reduce the opaque areas to a minimum they are tapered and finally merge into the transparent portion of the shield. The reinforcements are disposed adjacent to the vertical edges of the shield and terminate at points spaced from the bottom edge of the shield. With this particular reinforcement structure practically the entire shield may be formed transparent, and the entire lower edge is transparent.

In using the present shield, the operator usually adjusts his eyes so that the lowermost edge of the shield is slightly lower than a line between his eyes and the oncoming light source so that it is possible to see the highway beneath the shield and still have his eyes protected from the glare. It is important, therefore, that the lower edge of the shield be transparent throughout its entire width.

Figure 2:
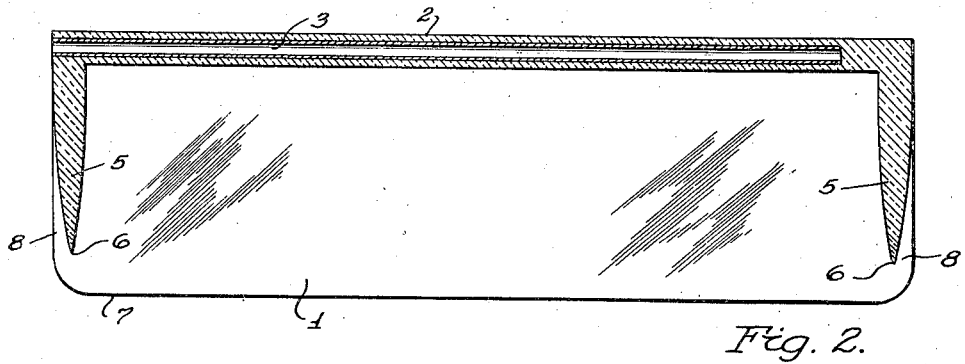
Figure 4:
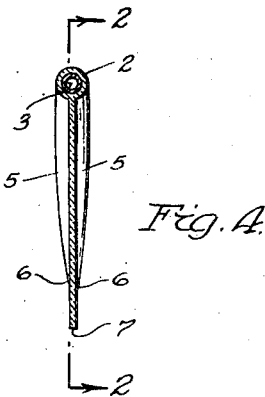

With the above and other ends in view the invention is more fully disclosed with reference to the accompanying drawing, in which Figure 1 is a front elevation;

Fig. 2 is a section taken on the line 2—2 of Fig. 4, and

Figure 3:
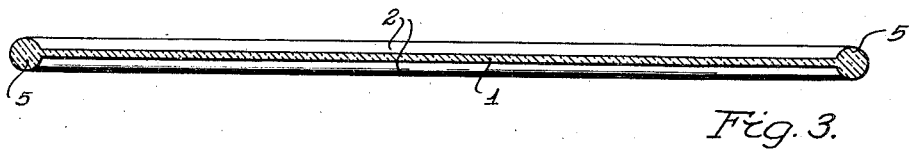

Figs. 3 and 4 are sections taken respectively on lines 3—3 and 4—4 of Fig. 1.

Like characters of reference are employed throughout to designate corresponding parts.

The numeral 1 designates a sheet of semi-transparent material, such as cellulose with coloring materials added thereto. This material, when formed in comparatively thin sheets is transparent and as it increases in thickness becomes translucent and opaque. The sheet 1 is of such thickness that it is partially transparent.

When the sheet 1 is molded it has a portion of comparatively heavy section extending along the top edge thereof, as indicated at 2, and imbedded in this heavy portion is a metal tube 3, one end of which is exposed. Integral with the heavy section portion 2 and with the sheet 1 are reinforcing ribs 5. The ribs 5 are disposed adjacent the two vertical or side edges of the shield and taper to a point as they extend downwardly. The ribs 5 terminate at the points designated 6, which are spaced from the bottom edge 7 of the sheet 1.

When the shield is placed in use it is supported upon a rod which is inserted in the metal tube 3. The tube, therefore, in addition to reinforcing the shield, which must be formed comparatively thin in order to provide the desired degree of transparency, also serves as a bearing for the reception of a support.

In glare shield assemblies such as above described the shield is held in various positions of adjustment by friction. It is essential, therefore, that the part of the shield which receives the horizontal pivot be sufficiently strong to permit the insertion of a rod having the required proportions to induce friction. In addition to reinforcing the shield, the tube 3 also provides a bearing into which a pivot may be forced without setting up stresses and strains which cause cracking of the shield under the conditions of vibration which accompany operation of an automobile.

It will be noted, also, that the tapered ribs 5 in terminating short of the lower edge 7 of the shield provide a small area of transparent material beneath the same. It will also be noted that the tapered formation of the ribs provides a small transparent area 8 between the vertical edges of the shield and the adjacent ribs. The ribs 5, in tapering as shown, become themselves transparent and do not materially interfere with visibility through the lower portion of the shield.

Although a specific embodiment of the invention has been illustrated and described it will be understood that various changes may be made within the scope of the appended claims without departing from the spirit of the invention, and such changes are contemplated.

What I claim is:

1. In a glare shield formed of material in which the degree of transparency decreases with increasing thickness, a sheet formed of a thickness providing a predetermined degree of transparency, said sheet being reinforced at its upper edge by a comparatively thick portion integral with said sheet having continuations extending downwardly adjacent the vertical edges of the sheet, and a metal tube permanently imbedded in the thickened portion at the upper edge of the shield to reinforce the same and provide a bearing for a support.

2. In a glare shield, a sheet of semi-transparent material, a thickened portion at one edge of said sheet, and a metal reinforcement permanently and entirely imbedded in said thickened portion, said reinforcement being hollow and adapted to receive a supporting member.

3. In a glare shield, a sheet of semi-transparent material, a thickened portion at one edge of said sheet and integral therewith, and a metal reinforcement permanently imbedded in said thickened portion, said reinforcement being tubular and having an end exposed whereby it is adapted to receive the end of a supporting rod.

4. In a glare shield, a sheet of semi-transparent material, a thickened portion at one edge of said sheet, and a metal reinforcement permanently imbedded in said thickened portion, said thickened portion having tapered integral extensions extending adjacent edges of said sheet to reinforce the same.

REX C. JACOBS.